(12) United States Patent
Filsfils et al.

(10) Patent No.: US 9,749,187 B2
(45) Date of Patent: *Aug. 29, 2017

(54) SEGMENT ROUTING INTO A LABEL DISTRIBUTION PROTOCOL DOMAIN

(71) Applicant: Cisco Technology, Inc., San Jose, CA (US)

(72) Inventors: Clarence Filsfils, Brussels (BE); Ahmed R. Bashandy, Milpitas, CA (US); David D. Ward, Los Gatos, CA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,262

(22) Filed: Sep. 29, 2016

(65) Prior Publication Data
US 2017/0019330 A1    Jan. 19, 2017

Related U.S. Application Data

(63) Continuation of application No. 14/210,729, filed on Mar. 14, 2014, now Pat. No. 9,491,058.
(Continued)

(51) Int. Cl.
*H04L 12/24* (2006.01)
*H04L 12/721* (2013.01)
(Continued)

(52) U.S. Cl.
CPC ............ *H04L 41/12* (2013.01); *H04L 45/04* (2013.01); *H04L 45/12* (2013.01); *H04L 45/46* (2013.01);
(Continued)

(58) Field of Classification Search
None
See application file for complete search history.

(56) References Cited

U.S. PATENT DOCUMENTS

| | | | |
|---|---|---|---|
| 6,032,197 A | 2/2000 | Birdwell | 709/216 |
| 6,374,303 B1 | 4/2002 | Armitage et al. | 709/242 |

(Continued)

FOREIGN PATENT DOCUMENTS

| | | | |
|---|---|---|---|
| CN | 102132533 A | 7/2011 | H04L 12/56 |
| CN | 102299852 A | 12/2011 | H04L 12/56 |

(Continued)

OTHER PUBLICATIONS

Psenak, Peter et al., "Enforcing Strict Shortest Path Forwarding Using Strict Segment Identifiers"; U.S. Appl. No. 15/165,794, filed May 26, 2016; consisting of Specification, Claims, Abstract, and Drawings (52 pages).

(Continued)

*Primary Examiner* — Brandon Renner
(74) *Attorney, Agent, or Firm* — Campbell Stephenson LLP

(57) ABSTRACT

A method, apparatus and memory for forwarding packets through a network domain containing nodes that are label distribution protocol (LDP) enabled and nodes that are segment routing (SR) enabled. In one embodiment, the method may include receiving at a hybrid node a packet with an attached segment identifier and detaching the segment identifier from the packet. This embodiment of the method continues with attaching a first LDP label to the packet after the segment identifier is detached and forwarding the packet with the attached first LDP label on a path toward a first LDP enabled node.

20 Claims, 5 Drawing Sheets

Related U.S. Application Data

(60) Provisional application No. 61/791,242, filed on Mar. 15, 2013.

(51) Int. Cl.
*H04L 12/723* (2013.01)
*H04L 12/715* (2013.01)
*H04L 12/741* (2013.01)
*H04L 12/931* (2013.01)

(52) U.S. Cl.
CPC ............ *H04L 45/50* (2013.01); *H04L 45/507* (2013.01); *H04L 45/54* (2013.01); *H04L 45/74* (2013.01); *H04L 45/745* (2013.01); *H04L 49/608* (2013.01)

(56) References Cited

U.S. PATENT DOCUMENTS

| | | | |
|---|---|---|---|
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,049,233 B2 | 6/2015 | Frost et al. | |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 2001/0037401 A1 | 11/2001 | Soumiya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2004/0202158 A1 | 10/2004 | Takeno | 379/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Siereki | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0296710 A1 | 12/2009 | Agrawal | 370/392 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.53 |
| 2010/0284309 A1 | 11/2010 | Allan et al. | 370/256 |
| 2011/0060844 A1 | 3/2011 | Allan et al. | 709/241 |
| 2011/0063986 A1 | 3/2011 | Denecheau | 370/248 |
| 2011/0228780 A1 | 9/2011 | Ashwood-Smith | 370/392 |
| 2011/0261722 A1 | 10/2011 | Awano | 370/254 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carney et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1* | 8/2012 | Kini | H04L 45/22 370/228 |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang et al. | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0169370 A1 | 6/2014 | Filsfils et al. | 370/392 |
| 2014/0177638 A1 | 6/2014 | Bragg et al. | 370/395.3 |
| 2014/0189156 A1 | 7/2014 | Morris | 709/238 |
| 2014/0254596 A1 | 9/2014 | Filsfils et al. | 370/392 |
| 2014/0269266 A1 | 9/2014 | Filsfils et al. | 370/228 |

(56) References Cited

U.S. PATENT DOCUMENTS

| | | | |
|---|---|---|---|
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0369356 A1 | 12/2014 | Bryant et al. | 370/392 |
| 2015/0023328 A1 | 1/2015 | Thubert et al. | 370/336 |
| 2015/0030020 A1 | 1/2015 | Kini | 370/389 |
| 2015/0256456 A1 | 9/2015 | Previdi et al. | 370/389 |
| 2015/0263940 A1 | 9/2015 | Kini | 370/236.2 |
| 2015/0381406 A1 | 12/2015 | Francois | 370/218 |
| 2016/0006614 A1 | 1/2016 | Zhao | 370/254 |
| 2016/0021000 A1 | 1/2016 | Previdi et al. | 370/389 |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2016/0352654 A1 | 12/2016 | Filsfils et al. | 370/392 |
| 2017/0019330 A1 | 1/2017 | Filfils et al. | 370/389 |
| 2017/0104673 A1 | 4/2017 | Bashandy et al. | 370/392 |
| 2017/0111277 A1 | 4/2017 | Previdi et al. | 370/392 |

FOREIGN PATENT DOCUMENTS

| | | | | |
|---|---|---|---|---|
| CN | 102498694 A | 6/2012 | | H04L 12/56 |
| CN | 102714625 A | 10/2012 | | H04L 12/56 |

OTHER PUBLICATIONS

Nainar, Nagendra Kumar et al., "Reroute Detection in Segment Routing Data Plane"; U.S. Appl. No. 15/266,498, filed Sep. 15, 2016; consisting of Specification, Claims, Abstract, and Drawings (61 pages).

Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

Alcatel-Lucent, "Segment Routing and Path Computation Element—Using Traffic Engineering to Optimize Path Placement and Efficiency in IP/MPLS Networks"; Technology White Paper; 2015; 28 pages.

Awduche, Daniel O., et al., "RSVP-TE: Extensions to RSVP for LSP Tunnels," Network Working Group, Internet-Draft, Aug. 2000, pp. 1-12.

Awduche, Daniel O., et al., "RSVP-TE: Extensions to RSVP for LSP Tunnels," Network Working Group, Request for Comments 3209, Dec. 2001, pp. 1-61.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Backes, P. and Rudiger Geib, "Deutsche Telekom AG's Statement About IPR Related to Draft-Geig-Spring-OAM-Usecase-01," Feb. 5, 2014, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Cisco Systems, Inc., "Introduction to Intermediate System-to-Intermediate System Protocol," published 1992-2002; pp. 1-25.

Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Farrel, A., et al., Old Dog Consulting, A Path Computation Element (PCE)—Based Architecture, Network Working Group, Request for Comments 4655, Aug. 2006, pp. 1-80.

Farrel, A., et al., Old Dog Consulting, Inter-Domain MPLS and GMPLS Traffic Engineering—Resource Reservation Protocol-Traffic Enginerring (RSVP-TE) Extensions, Network Working Group, Request for Comments 5151, Feb. 2008, pp. 1-25.

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, Jun. 28, 2013, pp. 1-28.

Filsfils, C., et al., Cisco Sytems, Inc., "Segment Routing Architecture"; draft-filsfils-rtgwg-segment-routing-01, Network Working Group, Internet-Draft, Oct. 21, 2013, pp. 1-28.

Filsfils, C. et al., Cisco Systems, Inc., "Segment Routing Interoperability with LDP"; draft-filsfils-spring-segment-routing-ldp-interop-01.txt; Apr. 18, 2014, pp. 1-16.

Filsfils, C. et al., "Segment Routing Architecture"; draft-ietf-spring-segment-routing-07; Network Working Group, Internet-Draft; Dec. 15, 2015; pp. 1-24.

Filsfils, C. et al., "Segment Routing Use Cases", draft-filsfils-rtgwg-segment-routing-use-cases-02; Network Working Group; Internet-Draft; Oct. 21, 2013; pp. 1-36.

Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.

Frost, D., et al., Cisco Systems, Inc., "MPLS Generic Associated Channel (G-Ach) Advertisement Protocol," Request for Comments 7212, Jun. 2014, pp. 1-23.

Geib, R., "Segment Routing Based OAM Use Case," IETF 87, Berlin, Jul./Aug. 2013, pp. 1-3.

Geib, R., Deutsch Telekom, "Use Case for a Scalable and Topology Aware MPLS data plane monitoring System," draft-geib-spring-oam-usecase-00; Internet-Draft, Oct. 17, 2013, pp. 1-7.

Geib, R., Deutsch Telekom, "Use Case for a Scalable and Topology Aware MPLS Data Plane Monitoring System," draft-geib-spring-oam-usecase-01; Internet-Draft, Feb. 5, 2014, pp. 1-10.

Gredler, H., et al., Juniper Networks, Inc., "Advertising MPLS Labels in IS-IS draft-gredler-isis-label-advertisement-00," Internet-Draft; Apr. 5, 2013; pp. 1-13.

Gredler, H. et al., hannes@juniper.net, IETF87, Berlin, "Advertising MPLS LSPs in the IGP," draft-gredler-ospf-label-advertisement, May 21, 2013; pp. 1-14.

Guilbaud, Nicolas and Ross Cartlidge, "Google—Localizing Packet Loss in a Large Complex Network," Feb. 5, 2013, pp. 1-43.

Imaizumi, H., et al.; Networks, 2005; "FMEHR: An Alternative Approach to Multi-Path Forwarding on Packed Switched Networks," pp. 196-201.

Kompella, K. et al, Juniper Networks, "Label Switched Paths (LSP) Hierarchy with Generalized Multi-Protocol Label Switching

(56) References Cited

OTHER PUBLICATIONS (GMPLS) Traffic Engineering (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.
Raszuk, R., NTT 13, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Li, T., et al., Redback Networks, Inc., "IS-IS Extensions for Traffic Engineering," Network Working Group, Request for Comments 5305, Oct. 2008, 17 pages.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.
Vasseur, JP, et al.; Cisco Systems, Inc. Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.
Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.
Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.
Akiya, N. et al., "Seamless Bidirectional Forwarding Detection (BFD) for Segment Routing (SR)"; draft-akiya-bfd-seamless-sr-03; Internet Engineering Task Force; Internet-DraftAug. 23, 2014; 7 pages.
Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.
Akiya, N., "Segment Routing Implications on BFD"; Sep. 9, 2013; 3 pages.
Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing with MPLS Data Plane", draft-ietf-spring-segment-routing-mpls-05; Network Working Group; Internet-Draft; Jul. 6, 2016; 15 pages.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.
Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.
Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

* cited by examiner

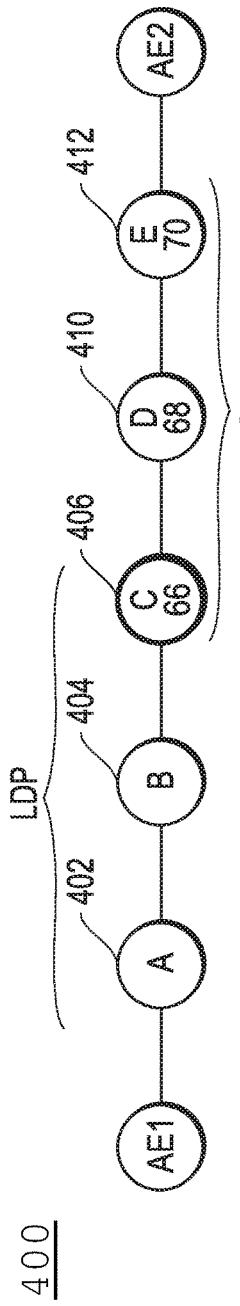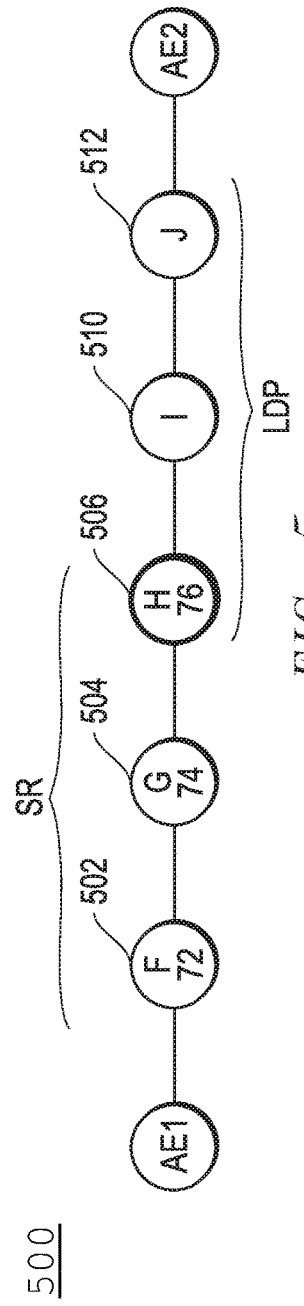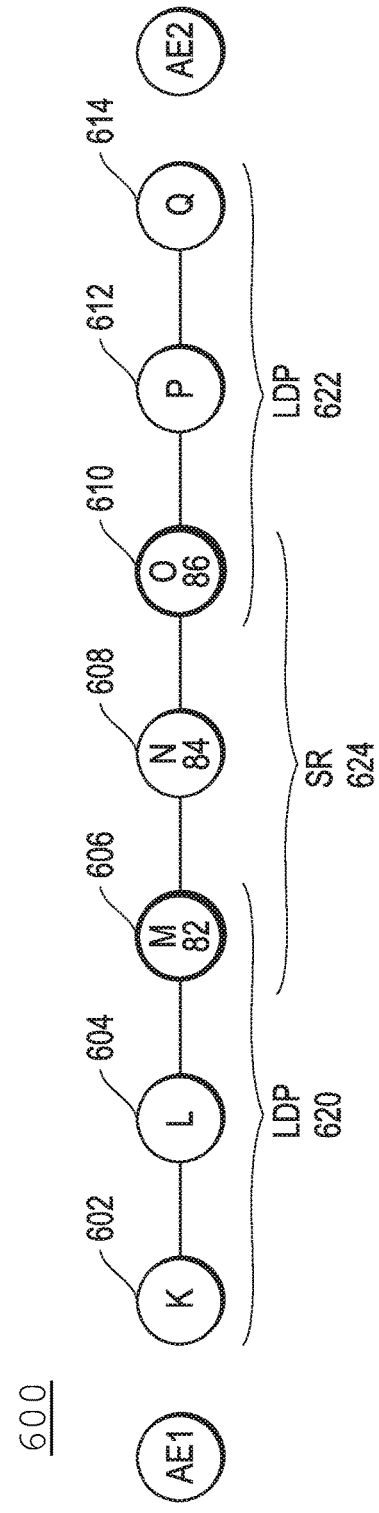
FIG. 4
FIG. 5
FIG. 6

SEGMENT ROUTING INTO A LABEL DISTRIBUTION PROTOCOL DOMAIN

RELATED APPLICATIONS

The present patent application is a continuation of U.S. patent application Ser. No. 14/210,729, filed on Mar. 14, 2014 and entitled "Label Distribution Protocol Over Segment Routing," now U.S. Pat. No. 9,491,058 issued on Nov. 8, 2016, which claims the domestic benefit under Title 35 of the United States Code§119(e) of U.S. Provisional Patent Application Ser. No. 61/791,242 entitled "Segment Routing," filed Mar. 15, 2013. Both are hereby incorporated by reference in their entirety and for all purposes as if completely and fully set forth herein.

BACKGROUND

Network nodes forward packets using forwarding tables. Network nodes may take form in one or more routers, one or more bridges, one or more switches, one or more servers, or any other suitable communications processing device. A packet is a formatted unit of data that typically contains control information and payload data. Control information may include: source and destination IP addresses, error detection codes like checksums, sequencing information, etc. Control information is typically found in packet headers and trailers, with payload data in between.

Packet forwarding requires a decision process that, while simple in concept, can be complex. Since packet forwarding decisions are handled by network nodes, the total time required for this can become a major limiting factor in overall network performance.

Multiprotocol Label Switching (MPLS) is one packet forwarding mechanism. MPLS Nodes make packet forwarding decisions based on Label Distribution Protocol (LDP) distributed labels attached to packets and LDP forwarding tables. LDP is a process in which network nodes capable of MPLS exchange LDP labels (hereinafter labels). Packet forwarding based on labels stands in stark contrast to traditional Internet Protocol (IP) routing in which packet forwarding decisions are made by nodes using IP addresses contained within the packet.

BRIEF DESCRIPTION OF THE DRAWINGS

The present disclosure may be better understood, and its numerous objects, features, and advantages made apparent to those skilled in the art by referencing the accompanying drawings.

FIG. 4 is a block diagram illustrating certain components of an example network.

FIG. 5 is a block diagram illustrating certain components of an example network.

FIG. 6 is a block diagram illustrating certain components of an example network.

DETAILED DESCRIPTION

1. Overview

Figure 1:
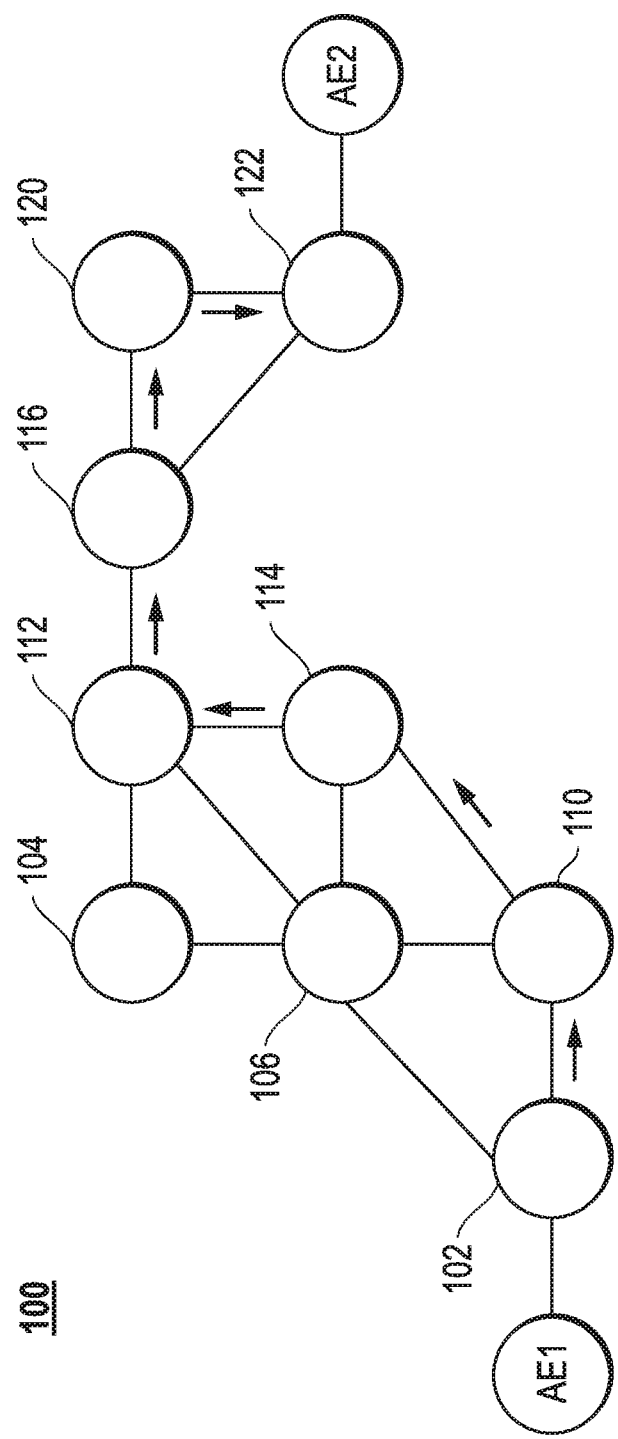
FIG. 1 is a block diagram illustrating certain components of an example network.

A method and apparatus is disclosed for forwarding packets through a network domain that contains nodes that are LDP enabled and nodes that are segment routing (SR) enabled. In one embodiment, the method may include a network node receiving a packet with a label attached thereto. The node swaps the label with a segment identifier (ID). The node then forwards the packet to an SR node. In another embodiment, the method may include a network node receiving a packet with a segment ID attached thereto. The node swaps the segment ID with a label. The node then forwards the packet to an LDP enabled node.

2. Packet Forwarding Mechanisms

IP routing and MPLS are distinct packet forwarding mechanisms. IP routing uses IP addresses inside packet headers to make packet forwarding decisions. In contrast, MPLS implements packet forwarding decisions based on short path identifiers called labels attached to packets. Segment routing (SR) is yet another packet forwarding mechanism and can be seen as a modification of MPLS. SR is similar to MPLS in many regards and employs many of the data plane functions thereof. For example, like MPLS packet forwarding decisions in SR can be based on short path identifiers called segment IDs attached to packets. While similarities exist between MPLS and SR, substantial differences exist between SR and MPLS as will be more fully described below.

2.1 IP Packet Routing

IP packet routing uses IP forwarding tables, which are created at nodes using routing information distributed between nodes via one or more protocols like the internal gateway protocol (IGP) and/or the border gateway protocol (BGP). In simple terms, IP forwarding tables map destination addresses to the next hops that packets take to reach their destinations. When a node receives a packet, the node can access a forwarding table using the packet's destination IP address and lookup a corresponding egress interface to the next hop. The node then forwards the packet through the egress interface. The next hop that receives the packet performs its own forwarding table lookup using the same destination IP address in the packet, and so on.

2.2 MPLS and LDP

MPLS is commonly employed in provider networks consisting of interconnected LDP nodes. For the purposes of explanation, LDP nodes take form in MPLS enabled nodes that also implement LDP in the control plane. Packets enter an MPLS network via an ingress edge LDP node, travel hop-by-hop along a label-switched path (LSP) that typically includes one or more core LDP nodes, and exit via an egress edge LDP node.

Packets are forwarded along an LSP based on labels and LDP forwarding tables. Labels allow for the use of very fast and simple forwarding engines in the data planes of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is employed in the control planes of nodes. For purpose of explanation, LDP nodes are those nodes that employ only LDP in their control plane. Two LDP nodes, called LDP peers, can bi-directionally exchange labels on a FEC by FEC basis. LDP can be used in a process of building and maintaining LDP forwarding tables that map labels and next hop egress interfaces. These forwarding tables can be used to forward packets through MPLS networks as more fully described below.

When a packet is received by an ingress edge LDP node of an MPLS network, the ingress node may use information in the packet to determine a FEC corresponding to an LSP the packet should take across the network to reach the packet's destination IP address. In one embodiment, the FEC is an identifier of the egress edge node that is closest to the packet's destination IP address. In this embodiment, the FEC may take form in the egress edge node's loopback address.

Characteristics for determining the FEC for a packet can vary, but typically the determination is based on the packet's destination IP address. Quality of Service for the packet or other information may also be used to determine the FEC. Once determined, the ingress edge LDP node can access a table to select a label that is mapped to the FEC. The table may also map a next hop egress interface to the FEC. Before the ingress edge LDP node forwards the packet to the next hop via, the ingress node attaches the label.

When an LDP node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the LDP node swaps the incoming label with the outgoing label. The next hop receives the packet with label and may perform the same process. This process is often called hop-by-hop forwarding along a non-explicit path (i.e., the LSP). The penultimate node in the LSP may pop or remove the incoming label before forwarding the packet to an egress edge LDP node in the network, which in turn may forward the packet towards its destination using the packet's destination address and an IP forwarding table. In another embodiment, the egress edge LDP node may pop the incoming label before forwarding the packet using the destination address and an IP forwarding table.

To illustrate MPLS aspects, FIG. 1 shows a portion of an example MPLS network 100 that includes LDP nodes 102-122 coupled together via communication links. An LSP from node 102 to node 122 can be created so that all packets of a stream associated with a particular FEC sent from node 102 to node 122 will travel through the same set of nodes. Each LDP node maintains information for the LSP established through it in an LDP forwarding table. Thus, if node 110 knows that node 114 is the next hop along the LSP for all packets received from node 102 that are destined for node 122, node 110 can forward the packets to node 114.

2.3 Segment Routing

Segment routing (SR) is a mechanism in which nodes forward packets using SR forwarding tables and segment IDs. Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR) make packet forwarding decisions based on segment IDs as opposed to LDP distributed labels, and as a result SR nodes need not employ LDP in their control planes. In one embodiment, segment IDs are substantially shorter than labels. The range for segment IDs may be distinct from the range for labels. Unless otherwise indicated, the SR nodes lack LDP in their control plane.

Packets can enter an SR enabled network (i.e., a network of nodes that are SR enabled) via an ingress edge SR node, travel hop-by-hop along a segment path (SP) that includes one or more core SR nodes, and exit the network via an egress edge SR node.

Like labels, segment IDs are short (relative to the length of an IP address or a FEC), fixed-length identifiers. In one embodiment, segment IDs are shorter than labels. Segment IDs may correspond to topological segments of a network, services provided by network nodes, etc. Topological segments represent one hop or multi hop paths to SR nodes. Topological segments act as sub-paths that can be combined to form an SP. Stacks of segment IDs can represent SPs, and SPs can be associated with FECs as will be more fully described below.

There are several types of segment IDs including nodal-segment IDs, adjacency-segment IDs, etc. Nodal-segment IDs are assigned to SR nodes so that no two SR nodes belonging to a network domain are assigned the same nodal-segment ID. Nodal-segment IDs can be mapped to unique node identifiers such as node loopback IP addresses (hereinafter node loopbacks). In one embodiment, all assigned nodal-segment IDs are selected from a predefined ID range (e.g., [32, 5000]). A nodal-segment ID corresponds to a one-hop or a multi-hop, shortest path (SPT) to an SR node assigned the nodal-segment ID as will be more fully described below.

An adjacency-segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency-segment IDs; adjacency-segment IDs may not be unique within a network. This disclosure will presume that only one link exists between nodes in a network, it being understood the present disclosure should not be limited thereto.

Each SR node can assign a distinct adjacency-segment ID for each of the node's links. Adjacency-segment IDs are locally significant; separate SR nodes may assign the same adjacency-segment ID, but the adjacency-segment ID represents distinct links. In one embodiment, adjacency-segment IDs are selected from a predefined range that is outside the predefined range for nodal-segment IDs.

SR nodes can advertise routing information including nodal-segment IDs bound to loopbacks, adjacency-segment IDs mapped to link IDs, etc., using protocols such as IGP and/or BGP with SR extension. Nodes may use the routing information they receive in order to create topology maps of the network. The maps can be used to create or update forwarding tables. To illustrate, a node can use the map it creates to identify next hop egress interfaces for shortest paths (SPTs) to respective node loopbacks. The identified SPT or next hop egress interfaces for the loopbacks are then mapped to respective nodal-segment IDs in the forwarding table. SR nodes can also map their adjacency-segment IDs to egress interfaces for respective links in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID should be the only node in the network area that has a SR forwarding table that maps the adjacency-segment ID to an egress interface.

As noted above, SR enables segment paths (SPs) through a network. SPs can be associated with FECs. Packets associated with the same FEC normally traverse the same SP towards their destination. Nodes in SPs make forwarding decisions based on segment IDs, not based on the contents (e.g., destination IP addresses) of packets. As such, packet forwarding in SPs is not dependent on a particular Layer 2 technology.

SR edge nodes and/or other devices (e.g., a path computation node) can use advertised routing information (nodal-segment IDs bound to loopbacks, adjacency-segment IDs mapped to link IDs, etc.) and topological maps to create ordered lists of segment IDs (i.e., segment ID stacks). Segment ID stacks correspond to respective SPs. Individual segment IDs in a stack may correspond to respective segments or sub paths of a corresponding SP.

When an ingress edge SR node receives a packet, the node or a path computation element in data communication with the node, can select an SP for the packet based on information contained in the packet. In one embodiment, a FEC may be determined for the packet using the packet's destination address. Like MPLS, this FEC may take form in an identifier (e.g., loopback) of the egress edge node that is closest to the destination IP address of the received packet. The FEC is then used to select a segment ID stack mapped thereto. The ingress edge node can attach the selected segment ID stack to the packet via a header. The packet with attached stack is forwarded along and traverses the segments of the SP in an order that corresponds to the list order of the segment IDs in the stack. A forwarding engine operating in the data plane of each SR node can use the top segment ID within the stack to lookup the egress interface for next hop. As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS, however, segment IDs are not swapped as the packet and attached segment ID stack are forwarded along the SP.

Figure 2:
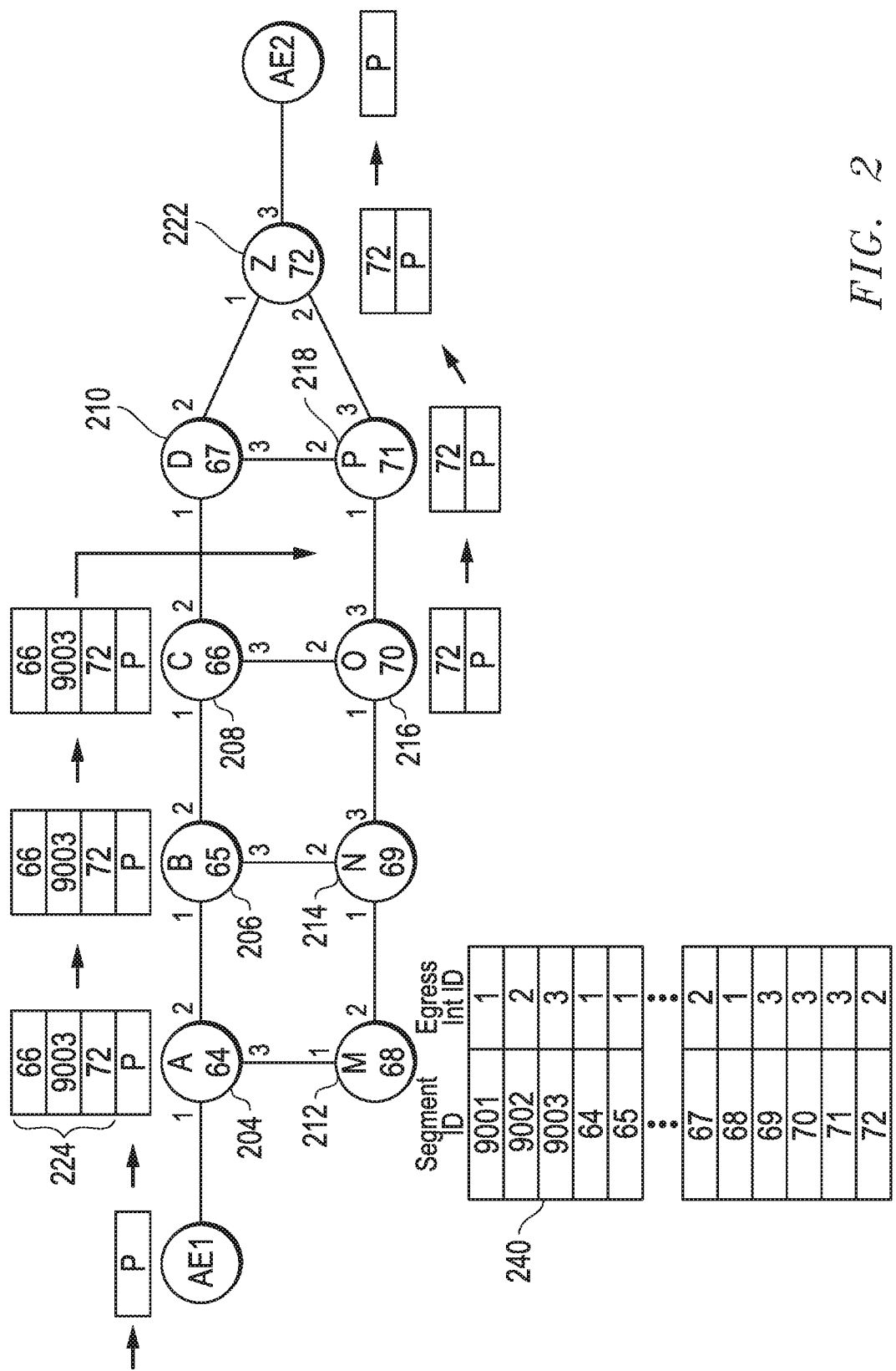
FIG. 2 is a block diagram illustrating certain components of an example network.

To illustrate general concepts of SR, FIG. 2 shows an example SR enabled provider network that is in data communication with nodes AE1 and AE2. Network 202 consists of SR nodes 204-222. Nodes 204-210 are assigned unique nodal-segment IDs 64-67, respectively, nodes 212-218 are assigned unique nodal-segment IDs 68-71, respectively, and node 222 is assigned unique nodal-segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 202, which in turn can be used to create SPs and/or to identify SPTs and thus next hop egress interfaces for SR forwarding tables. Nodes 204-222 can also assign locally significant adjacency-segment IDs. For example, node 208 can assign adjacency-segment IDs 9001-9003 to links CB, CD, and CO, respectively.

Each of SR nodes 204-222 can advertise routing information to the other nodes in network 202 using IGP with SR extension. For example, node 208 can generate and send one or more advertisements that include adjacency-segment IDs 9001-9003 bound to link IDs CB, CD, and CO, respectively, and nodal-segment ID 66 bound to loopback C. One of ordinary skill understands that advertisements may contain additional information. Using the advertisements they receive, the control planes of nodes 204-222 can generate respective SR forwarding tables for use in the data planes. For example, node 208 can generate example SR forwarding table 240 that maps adjacency-segment IDs 9001-9003 to node interface IDs 1-3, respectively, and nodal-segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. It is noted that in the embodiment shown, only SR forwarding table 240 maps adjacency-segment IDs 9001-9003 to interfaces; SR forwarding tables in the other nodes of network 202 should not map adjacency-segment IDs 9001-9003.

In addition to creating SR forwarding tables, SR nodes or a path computation node (not shown) can create segment ID stacks for respective SPs. For example, ingress edge node 204 creates example segment ID stack 224 for an SP between ingress edge node 204 and egress edge node 222. Example segment stack 224 can be created for a particular FEC (e.g., FEC Z). Example stack 224 includes three segment IDs: nodal-segment IDs 66 and 72 advertised by nodes 208 and 222, respectively, and adjacency-segment ID 9003 advertised by node 208. Stack 224 corresponds to an SP in which packets flow in order through nodes 204, 206, 208, 216, 218, and 222.

In response to receiving a packet that is destined for a device that can be reached via AE2, which in turn can be reached via node 222, SR node 204 can select a segment ID stack based on information contained in the packet. For example, node 204 can select FEC Z (i.e., the loopback for node 222) for a received packet P based on the destination IP address in packet P and/or other information. FEC Z is mapped to example stack 224 in a table not shown. Node 204 attaches stack 224 to packet P. Example segment stack 224 lists segment IDs that correspond to one hop and multi hop segments that packets traverse to reach egress edge node 222. The one hop and multi hop segments collectively form the SP corresponding to stack 224. Once the segment stack 224 is attached to packet P, ingress SR enable node 204 may access a SR forwarding table (not shown) using the top segment ID (e.g., segment ID=66) to read egress interface identifier 2, which is the next hop egress interface for the SPT to the SR node assigned nodal-segment ID 66.

Figure 3:
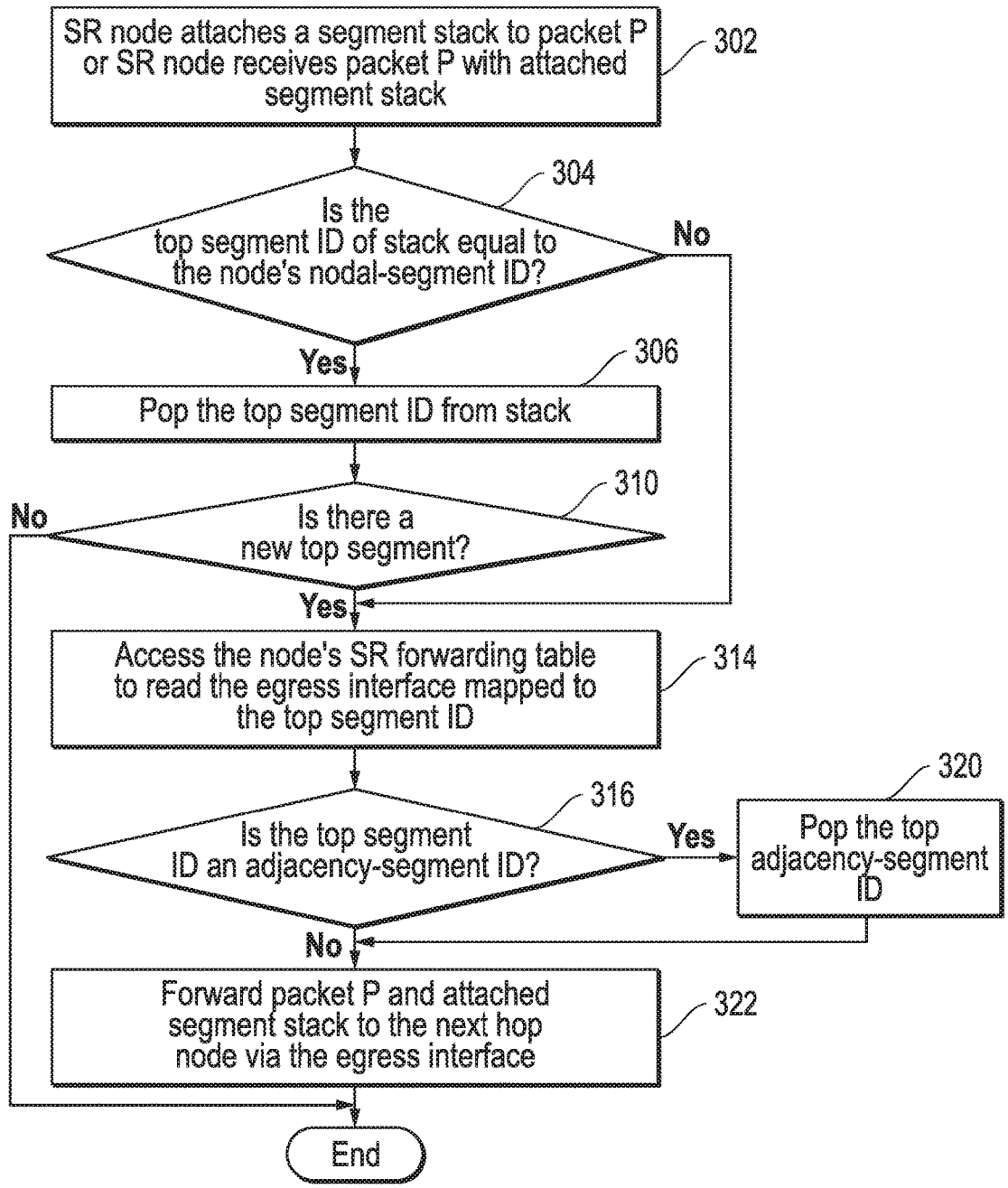
FIG. 3 is a flow chart illustrating an example process employed by a node of FIG. 2.

With continuing reference to FIG. 2, FIG. 3 illustrates example process of packet forwarding using segment IDs according to one embodiment. More particularly, FIG. 3 illustrates an example method performed by an SR node, including an edge node, in a network like that shown in FIG. 2. In response to receiving a packet with an attached segment ID stack, or in response to attaching a segment ID stack to a packet, the SR node determines in step 304 whether the top segment ID of the stack matches the nodal-segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency-segment ID. This determination can be implemented by simply comparing the top segment ID with the designated range of adjacency-segment IDs that are available for assignment within the network. If the top segment ID is found to be within the designated range, the top segment ID is an adjacency-segment ID and it is popped. In step 322 the SR node forwards packet P and attached stack to the next node via the egress interface identified in step 314.

With continuing reference to FIGS. 3, FIG. 2 shows packet P and attached stack 224 as it is forwarded by nodes. As shown, nodes 204 and 206 forward packet P and stack 224 without popping a segment ID. However, node 208 pops nodal-segment ID 66 and adjacency-segment ID 9003 in accordance with steps 306 and 320, respectively, before the packet P and stack 224 are forwarded to node 216 in accordance with step 322. Nodes 216 and 218 forward packet P and stack 224 without popping segment IDs. SR egress edge node 222 recognizes itself as the last hop of the SP. Eventually, node 222 may employ traditional IP routing and forward packet P to access node AE2 based on routing table lookup using the destination IP address within packet P.

3. Hybrid Networks

FIGS. 1 and 2 illustrate example provider networks that contain LDP nodes and SR nodes, respectively. Some providers may employ hybrid networks or networks that contain both LDP and SR nodes. Differences in the packet forwarding mechanisms described above with respect to SR and LDP nodes, however, may preclude interoperability between SR and LDP nodes when directly coupled to each other.

A hybrid network can successfully implement packet transport to its destination if, in one embodiment, the hybrid network is subdivided into intermediate system-intermediate system (IS-IS) or open shortest path (OSPF) areas or levels with SR/LDP nodes (i.e., nodes that implement both SR and LDP) at borders or boundaries therebetween. As will be more fully described below the SR/LDP nodes can act as level 1/level 2 border nodes that facilitate the exchange packets and routing information between SR and LDP areas. FIGS. 4-6 illustrate respective portions of example provider networks that employs SR, LDP, and SR/LDP nodes.

3.1 LDP Into SR

FIG. 4 illustrates a portion of an example hybrid network 400 that employs LDP, SR, and SR/LDP nodes. Nodes 402 and 404 are LDP enabled, nodes 410 and 412 are SR enabled, and border node 406 is SR/LDP enabled. Network 400 is subdivided into SR and LDP areas with nodes 402-406 contained in an LDP area and nodes 406-412 contained in an SR area. Additional areas are contemplated. SR/LDP node 406 may be contained in both the LSP and SR areas.

Nodes in network 400 have unique loopbacks. For example, nodes 402-412 are assigned loopbacks A-E, respectively. Each of the SR and SR/LDP nodes is assigned a nodal-segment ID that is unique within its SR area. Specifically, nodes 406-412 are assigned nodal-segment IDs 66-70, respectively.

All nodes in an area may employ IGP to advertise their routing information including their loopbacks to other nodes in the area. SR and SR/LDP nodes such as nodes 406-412 extend their IGP advertisements by binding their loopbacks to their respective nodal-segment IDs. Advertisements originating from the SR and SR/LDP nodes may also contain additional information indicating they are SR enabled. SR/LDP nodes are also capable of propagating loopback addresses of edge nodes of one area into an adjacent area using, for example, internal IGP. In this regard, an SR/LDP node can advertise that an edge node in one area can be reached via the SR/LDP node. For example SR/LDP node 406 can advertise to the LDP nodes that loopback E of node 412 is reachable via loopback C of SR/LDP node 406. This enables reachability of SR edge nodes via SR/LDP nodes. In one embodiment, SR/LDP nodes do not propagate nodal-segment IDs bound to SR edge node loopbacks into the LDP area.

The nodes in an area can use the routing information they receive, including loopbacks of edge nodes in other areas, to create paths and/or forwarding tables. For example nodes in the LDP area can create or update topology maps of their area, which in turn can be used to create or update LSPs and LDP forwarding tables. Since SR/LDP node 406 advertises loopback E can be reached via loopback C, the LDP nodes 402 and 404 use loopback C to calculate the SPT to loopback E. Entries in the LDP tables can map labels for FEC E using the SPT egress to loopback C Similarly, nodes in the SR area within can create or update topology maps of their area, which in turn can be used to create or update SPs and SR forwarding tables. SR/LDP nodes can create a forwarding table for each area in which they are contained. These tables can be logically linked to enable SR/LDP nodes such as node 406 to function as a merge point between LSPs and SPs as will be more fully described below. It is noted that while SR/LDP and LDP nodes in the LDP area exchange labels with each other via LDP peering sessions, SR/LDP and SR nodes in the SR area do not exchange LDP labels with each other. SR/LDP nodes can track neighbor nodes that are or are not LDP enabled. For example, SR/LDP node 406 will recognize that neighbor node 410 is not LDP enabled when node 410 fails to respond to an LDP peering request from SR/LDP node 406.

SR/LDP nodes, like node 406, are capable of exchanging packets between areas. SR/LDP nodes can transfer a packet from an LSP in the LDP area to an SP in the SR area. To illustrate, ingress edge LDP node 402 may receive a packet P destined for a device that is reachable via node AE2. In response to receiving the packet, ingress edge LDP node 402 or a path computation node may determine a FEC for packet P based upon information such as the packet's destination IP address. For example, node 402 may select loopback E as the FEC for an LSP the packet P should take to edge node 412. The selected FEC is mapped to label L1 by a table stored in memory of node 402. In accordance with the MPLS forwarding mechanism described above, ingress node 402 forwards the packet P and label L1 to the next hop (i.e., LDP node 404) of the LSP via the egress interface mapped to label L1. The next hop node 404 accesses its LDP forwarding table to read label L2, which is mapped to label L1. Node 404 swaps L1 with L2, and forwards the packet P to SR/LDP node 406.

SR/LDP node 406 is the last hop in the LSP. SR/LDP node 406 can forward the packet P on a corresponding SP. Using its logically linked LDP and SR forwarding tables, SR/LDP node 406 maps label L2 to loopback E, and loopback E to nodal-segment ID 70. It is noted that SR/LDP node 406 can map loopback E to nodal-segment ID 70 as a result of the advertisement it received previously from node 412 that included loopback E bound to segment ID 70. In an alternative embodiment, the SR/LDP can determine the nodal-segment ID by first determining the FEC (i.e., loopback E)

based upon information such as the destination IP address contained with the packet P. Regardless of the fashion in which SR/LDP node 406 determines the nodal-segment ID 70, SR/LDP node 406 essentially swaps the incoming label L2 with the nodal-segment ID 70 and forwards packet P with attached segment ID 70 in accordance with the process shown in FIG. 3 or a modification thereof.

3.2 SR Into LDP

SR/LDP nodes can transfer a packet from an LSP to an SP as described above. SR/LDP nodes can also transfer a packet from an SP to an LSP. FIG. 5 illustrates another example hybrid network 500 that includes nodes 502-512 coupled between nodes AE1 and AE2. Network 500 is subdivided into SR and LDP areas with nodes 502-506 contained in an SR area, and nodes 506-512 contained in an LDP area. SR/LDP node 506 is contained in both the LSP and SR areas. SR/LDP node 506 implements features of SR/LDP node 406 described above that enable transport of a packet from LDP enabled edge node 512 to SR enabled edge node 502. As will be more fully described below, SR node 506 also enables packet transport from SR edge node 502 to LDP edge node 512.

All nodes are assigned a unique loopback. For example, nodes 502-512 are assigned loopbacks F-J, respectively. Each of the SR and SR/LDP nodes is assigned a nodal-segment ID that is unique within network 500. Specifically, nodes 502-506 are assigned nodal-segment IDs 72-76, respectively.

Like the areas in FIG. 4, each area in the subdivided network 500 can be configured to implement its own IGP. In one embodiment, SR and SR/LDP nodes such as nodes 502-506 extend their IGP advertisements to include loopbacks bound to respective nodal-segment IDs. Advertisements originating from the SR and SR/LDP nodes may also contain additional information indicating they are SR enabled.

SR/LDP nodes can propagate the loopbacks of SR edge nodes into the LDP using, for example, internal IGP. For example SR/LDP node 506 can propagate the loopback J of node 512 into the SR area in addition to propagating the loopback F of node 502 into the LDP area. In this regard, SR/LDP node 506 can advertise to nodes 502 and 504 that loopback J assigned to LDP edge node 512 can be reached via loopback H assigned to SR/LDP node 506. Before an SR/LDP node propagates the loopback of an LDP edge node into the SR area, the SR/LDP node may bind a unique nodal-segment ID to the LDP edge node loopback. In the illustrated example, the loopback J is propagated into the SR area with a nodal-segment ID 80. This enables reachability of LDP edge nodes via SR/LDP nodes and SPs as will be more fully described below. An SR-TLV flag can be disabled to prevent PHP from occurring.

Area nodes use the routing information they receive, including loopbacks of edge nodes in other areas, to create paths and/or forwarding tables. Nodes in the LDP area can create or update topology maps of their area, which in turn can be used to create or update LSPs and LDP forwarding tables. Similarly, nodes in the SR area within can create or update topology maps of their area, which in turn can be used to create or update SPs and SR forwarding tables. Since SR/LDP node 506 advertises that loopback J/nodal-segment 80 can be reached via loopback H, the SR nodes 502 and 504 use loopback H to calculate the SPT to loopback J/nodal-segment ID 80. Entries in the SR tables map nodal-segment ID 80 to the SPT egress towards loopback H. SR/LDP nodes can create a forwarding table for each area in which they are contained. These tables can be logically linked or merged to enable SR/LDP nodes such as node 506 to function as a merge point between LSPs and SPs as will be more fully described below.

SR/LDP nodes can transfer a packet from an SP in the SR area to an LSP in the LDP area. To illustrate, ingress edge SR node 502 may receive a packet P destined for a device that is reachable via node AE2. In response to receiving the packet, ingress edge SR node 502 or a path computation node may determine a FEC for packet P based upon information such as the packet's destination IP address. For example, node 502 may select loopback J as the FEC for a path the packet P should take to edge node 512, which is connected to AE2. The selected FEC can be mapped to nodal-segment ID 80 by node 502. In accordance with the procedure described in FIG. 3, ingress node 502 forwards the packet P and nodal-segment ID 80 to the next hop (i.e., SR node 504) of the SP towards node 512 via the egress interface mapped to nodal-segment ID 80. The next hop node 504 accesses its SR forwarding table to read the egress interface to the next hop SR node 506.

When SR/LDP node 506 receives the packet P with attached nodal-segment ID 80, its forwarding table does not provide an egress interface for the next SR hop. Rather, the forwarding table entry mapped to the nodal-segment ID may indicate the packet should be forwarded on an LSP associated with FEC J. As a result, SR/LDP node 506 can forward the packet P on a corresponding LSP. To that end, the forwarding table may map loopback J to a label L3, which was received from LDP node 510 during a prior LDP peering session. SR/LDP node 506 removes nodal-segment ID 80 and attaches the label L3 to packet P. SR/LDP node 506 can then forward packet P with attached label L3 from the egress interface mapped to FEC J in the node's forwarding table. The next hop node 510 forwards the packet P to egress node 512 after swapping or popping label L3 in accordance with the MPLS forwarding mechanism described above.

3.3 LDP over SR

FIGS. 4 and 5 illustrate SR/LDP nodes that enable packet transfer from an SR area into LDP area, and LDP area into SR area, respectively. FIG. 6 illustrates a hybrid network 600 that enables packet transfer from an LDP area to another LDP area via an SR area.

FIG. 6 illustrates a portion of an example hybrid network 600 that employs LDP, SR, and SR/LDP nodes. LDP nodes 602, 604, 612, and 614 are LDP enabled, node 608 is SR enabled, and nodes 606 and 610 are SR/LDP enabled. Network 600 is divided into an SR and two LDP areas. Specifically, nodes 602-606 are contained in a first LDP area 620, nodes 610-614 are contained in a second LDP area 622, and nodes 606-610 are contained in an SR area 624. In this embodiment, SR/LDP nodes 606 and 610 act as border nodes. Operational aspects of SR/LDP nodes 406 and/or 506 can be employed by SR/LDP nodes 606 and 610 to enable packet transfer via the SR area.

Nodes in network 600 have unique loopbacks. For example, nodes 606-614 are assigned loopbacks K-Q, respectively. Each of the SR and SR/LDP nodes is assigned a nodal segment ID that is unique within its SR area. Specifically, nodes 606-610 are assigned nodal segments 82-86, respectively.

Nodes in each of the areas 620-624 may employ IGP to advertise their routing information including their loopbacks to other nodes in the area. SR and SR/LDP nodes 606-610 extend their advertisements by binding their loopbacks to their respective nodal-segment IDs. SR/LDP nodes 606 and 610 can propagate the loopbacks of edge nodes from one area into another in much the same manner in which SR/LDP nodes 406 and 506 propagate loopbacks of edge nodes into adjacent areas. To illustrate, SR/LDP node 610 can advertise to nodes in SR area 624, including nodes 608 and 606, that loopback Q, which is assigned to LDP edge node 614, can be reached via loopback O assigned to SR/LDP node 610. SR/LDP node 610 may bind a unique nodal-segment ID 90 to loopback Q in the advertisement that is propagated into SR area 624. This enables reachability of LDP edge node 614 via SR/LDP node 610 and an SP in area 624 as will be more fully described below. After SR/LDP node 610 advertises loopback Q to SR/LDP node 606, SR/LDP node 606 can in turn advertise to LDP nodes in area 620 that loopback Q is reachable via loopback M of SR/LDP node 606. This enables reachability of LDP edge node 614 via SR/LDP node 606 and an LSP in area 622. In one embodiment, SR/LDP node 606 does not propagate nodal-segment ID 90 bound to LDP edge node 614 by SR/LDP node 610.

The nodes in each area use the routing information they receive, including loopbacks of edge nodes in other areas, to create paths and/or forwarding tables. Nodes within the first LDP area 620 can create or update topology maps in this area, which in turn can be used to create LSPs and LDP forwarding tables. Since SR/LDP node 606 advertises loopback Q can be reached via loopback M, the LDP nodes 602 and 604 use loopback M to calculate the SPT to loopback Q. Nodes in the second LDP area 622 may likewise create or update topology maps in this area, which in turn can be used to create or update LSPs and forwarding tables. Lastly, nodes 606-610 in the SR area 624 can create or later update topology maps in this area, which in turn can be used to create or update SPs and SR forwarding tables. Since SR/LDP node 610 advertises that loopback Q/nodal-segment 90 can be reached via loopback O, nodes 606 and 608 use loopback O to calculate the SPT to loopback Q/nodal-segment ID 00. The SR/LDP nodes 606 and 610 can create a forwarding table for each area in which they are contained. The tables within an SR/LDP node can be logically linked to enable the SR/LDP nodes to function as merge points between LSPs and SPs.

SR/LDP node 606 can transfer a packet, which is received via an LSP in LDP area 620, to an SP in SR area 624, and SR/LDP 610 can transfer a packet, which is received via the SP in area 624, to an LSP in LDP are 622. In this fashion, network 600 can implement packet transfer over an SP. To illustrate, ingress LDP node 602 may receive a packet P destined for a device reachable via node AE2. In response to receiving the packet, ingress LDP node or a path computation node may determine a FEC for the packet P based upon information such as the packet's destination IP address. To illustrate, node 602 may select loopback Q as the FEC for packet P. The selected FEC corresponds to an LSP and is mapped in memory of node 602 to label L1. In accordance with the MPLS procedure described above, ingress node 602 forwards the packet P and label L1 to the next hop (LDP node 604) of the LSP toward node 614 via the egress interface mapped to label L1. The next hop 602 swaps L1 with L2, and forwards the packet P to SR/LDP node 606, which is the next and last hop on the LSP through LDP area 620.

SR/LDP node 606, using the logical combination of its LDP and SR forwarding tables it has in memory, maps labeled L2 to loopback O, loopback O to nodal segment 90. SR/LDP node 606 essentially swaps the incoming label L2 that is attached to the packet P with the nodal-segment ID 90. Thereafter, SR/LDP node 606 forwards the packet P with attached nodal-segment ID 90 in accordance with the process shown in FIG. 3 or a modification thereof. SR node 608 receives packet P with attached nodal-segment ID 90, and forwards the packet along with the segment ID 90 to SR/LDP node 610 in accordance with FIG. 3.

SR/LDP node 610 is the last hop in the SP-SR area 624. When SR/LDP node 610 receives packet P with attached nodal-segment ID 90, its forwarding table does not provide an egress interface for the next SR hop. Rather, the forwarding table entry mapped to the nodal-segment ID may indicate the packet should be forwarded on LSP in LDP area 622, which LSP is associated with a FEC identified by loopback Q. As a result, SR/LDP node 610 can forward the packet P toward its ultimate destination. To this end, SR/LDP node 610 may map loopback Q to a label L3, which was received from node 612 during a prior LDP peering session. SR/LDP node 610 removes nodal-segment ID 90 and attaches label L3 to packet P. SR/LDP node 610 can then forward packet P with attached label L3 via the egress interface mapped to FEC Q in the node's forwarding table. The next hop node 612 forwards the packet P to egress node 614 after swapping or popping label L3 in accordance the MPLS forwarding mechanism described above.

Figure 7:
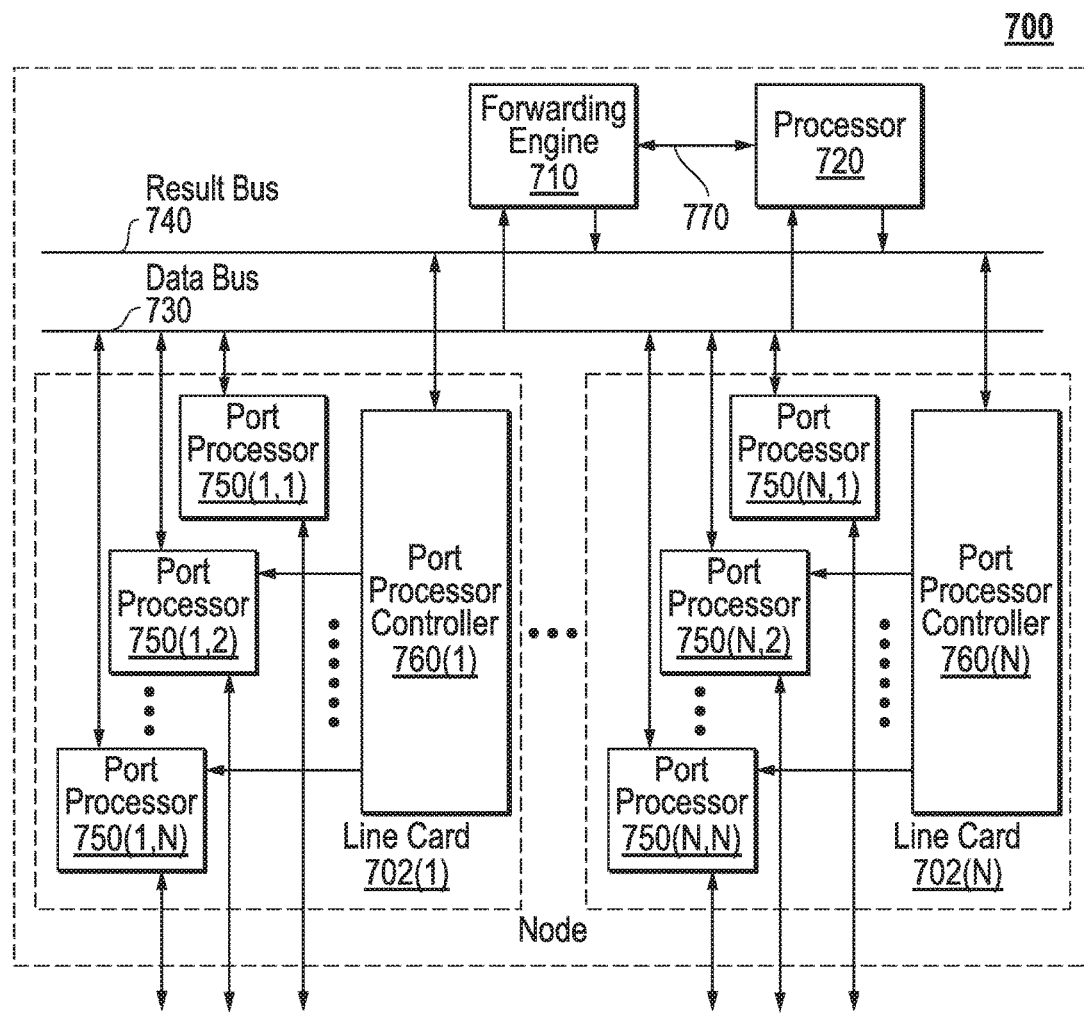
FIG. 7 is a block diagram illustrating certain components of an example node that can be employed in the network of FIGS. 1, 2, 4, 5 or 6.

FIG. 7 is a block diagram illustrating certain additional and/or alternative components of nodes that can be employed in the networks shown in FIG. 1, 2, 4, 5, or 6. In this depiction, node 700 includes a number of line cards (line cards 702(1)-(N)) that are communicatively coupled to a forwarding engine or packet forwarder 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

The processors 750 and 760 of each line card 702 may be mounted on a single printed circuit board. When a packet or packet and header are received, the packet or packet and header may be identified and analyzed by router 700 in the following manner Upon receipt, a packet (or some or all of its control information) or packet and header is sent from the one of port processors 750(1,1)-(N,N) at which the packet or packet and header was received to one or more of those devices coupled to data bus 730 (e.g., others of port processors 650(1,1)-(N,N), forwarding engine 710 and/or processor 720). Handling of the packet or packet and header can be determined, for example, by forwarding engine 710. For example, forwarding engine 710 may determine that the packet or packet and header should be forwarded to one or more of port processors 750(1,1)-(N,N). This can be accomplished by indicating to corresponding one(s) of port processor controllers 760(1)-(N) that the copy of the packet or packet and header held in the given one(s) of port processors 750(1,1)-(N,N) should be forwarded to the appropriate one of port processors 750(1,1)-(N,N). In addition, or alternatively, once a packet or packet and header has been identified for processing, forwarding engine 710, processor 720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a packet at a hybrid node, wherein
a segment identifier is attached to the packet,
the segment identifier has been advertised using a protocol other than label distribution protocol (LDP), and
the hybrid node employs LDP and segment routing in a control plane implemented by the hybrid node;
detaching the segment identifier from the packet;
attaching a first LDP label to the packet after the segment identifier is detached; and
forwarding the packet with the attached first LDP label on a path toward a first LDP enabled node.

2. The method of claim 1, wherein the first LDP enabled node is not segment routing enabled.

3. The method of claim 1, further comprising mapping the first LDP label to the segment identifier.

4. The method of claim 1, wherein the segment identifier is uniquely assigned to the first LDP enabled node.

5. The method of claim 1, wherein the segment identifier has been advertised with an instruction to disable removal of the segment identifier before the packet is received at the hybrid node.

6. The method of claim 1, wherein the packet with the attached segment identifier is received from a segment routing enabled node that is not LDP enabled.

7. The method of claim 1, wherein
the path toward the first LDP enabled node comprises a second LDP enabled node; and
the second LDP enabled node is adapted to
remove the first LDP label, and
forward the packet on the path toward the first LDP enabled node.

8. The method of claim 7, wherein the second LDP enabled node is further adapted to replace the first LDP label with a second LDP label before forwarding the packet, with the attached second LDP label, on the path toward the first LDP enabled node.

9. The method of claim 1 further comprising:
advertising, to other segment routing enabled nodes, the hybrid node as a way to reach the first LDP enabled node.

10. An apparatus comprising:
a hybrid node employing label distribution protocol (LDP) and segment routing in its control plane, the hybrid node comprising:
a port processor adapted to receive a packet with an attached segment identifier,
wherein
the segment identifier has been advertised using a protocol other than LDP; and
a processor adapted to
detach the segment identifier from the packet,
attach a first LDP label to the packet after the segment identifier is detached, and
forward the packet with the attached first LDP label on a path toward a first LDP enabled node.

11. The apparatus of claim 10, wherein the hybrid node further comprises a forwarding table mapping the first LDP label to the segment identifier.

12. The apparatus of claim 10, wherein the segment identifier is uniquely assigned to the first LDP enabled node.

13. The apparatus of claim 10, wherein the processor is further adapted to:
advertise, to other segment routing enabled nodes, the hybrid node as a way to reach the first LDP enabled node.

14. The apparatus of claim 13, wherein the processor is further adapted to advertise, to other segment routing enabled nodes, the segment identifier as an identifier assigned to the first LDP enabled node.

15. The apparatus of claim 10, wherein the first LDP enabled node is not segment routing enabled.

16. A memory storing executable instructions, wherein a node is configured to implement a method in response to executing the instructions, the method comprising:
receiving a packet at a hybrid node, wherein
a segment identifier is attached to the packet,
the segment identifier has been advertised using a protocol other than label distribution protocol (LDP), and
the hybrid node employs LDP and segment routing in a control plane implemented by the hybrid node;
detaching the segment identifier from the packet;
attaching a first LDP label to the packet after the segment identifier is detached; and
forwarding the packet with the attached first LDP label on a path toward a first LDP enabled node.

17. The memory of claim 16, wherein the first LDP enabled node is not segment routing enabled, and wherein the packet with the attached segment identifier is received from a segment routing enabled node that is not LDP enabled.

18. The memory of claim 16, wherein the method further comprises mapping the first LDP label to the segment identifier.

19. The memory of claim 16, wherein the segment identifier is uniquely assigned to the first LDP enabled node.

20. The memory of claim 16, wherein the method further comprises advertising, to other segment routing enabled nodes, the hybrid node as a way to reach the first LDP enabled node.

* * * * *